Patented Mar. 27, 1934

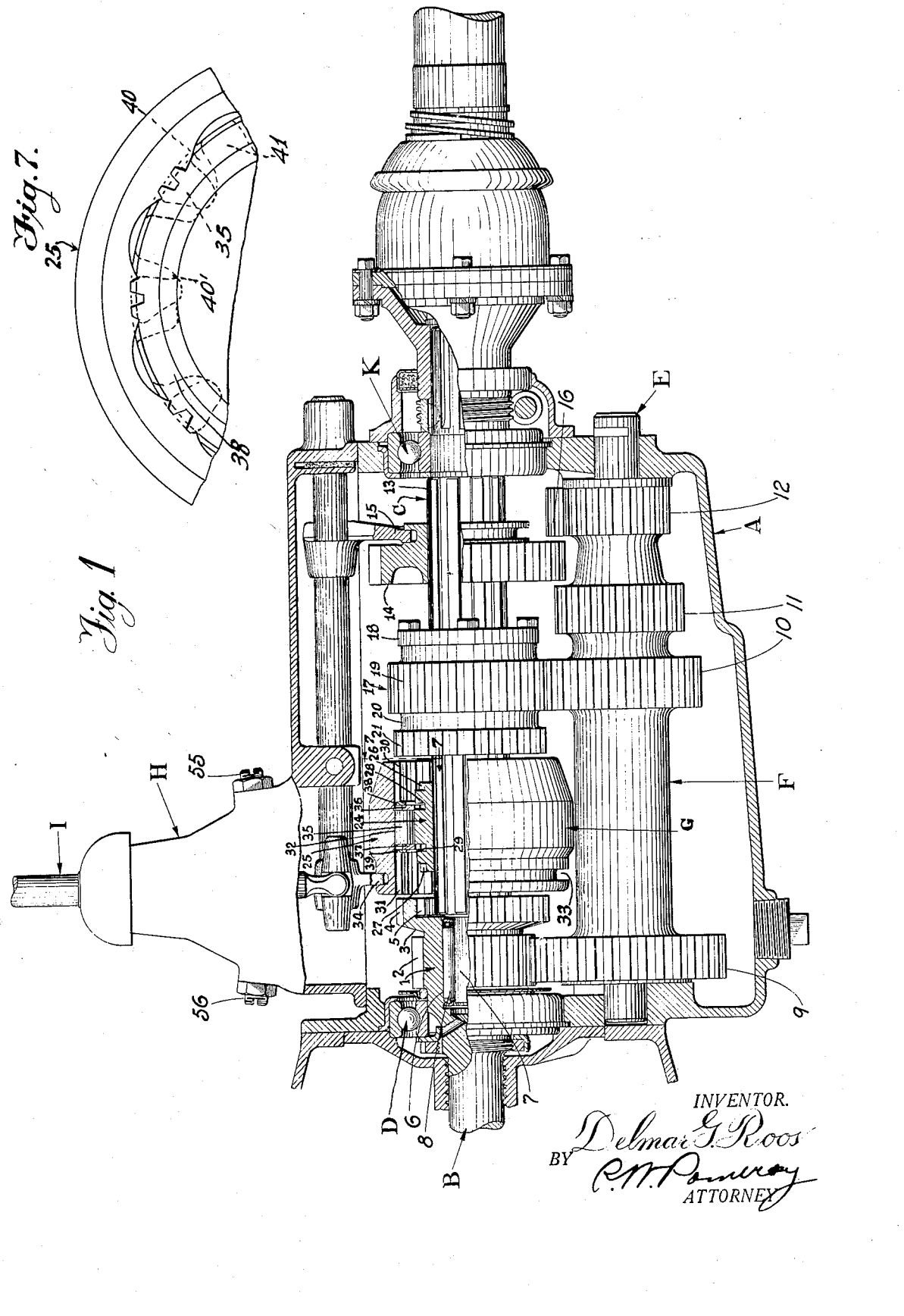

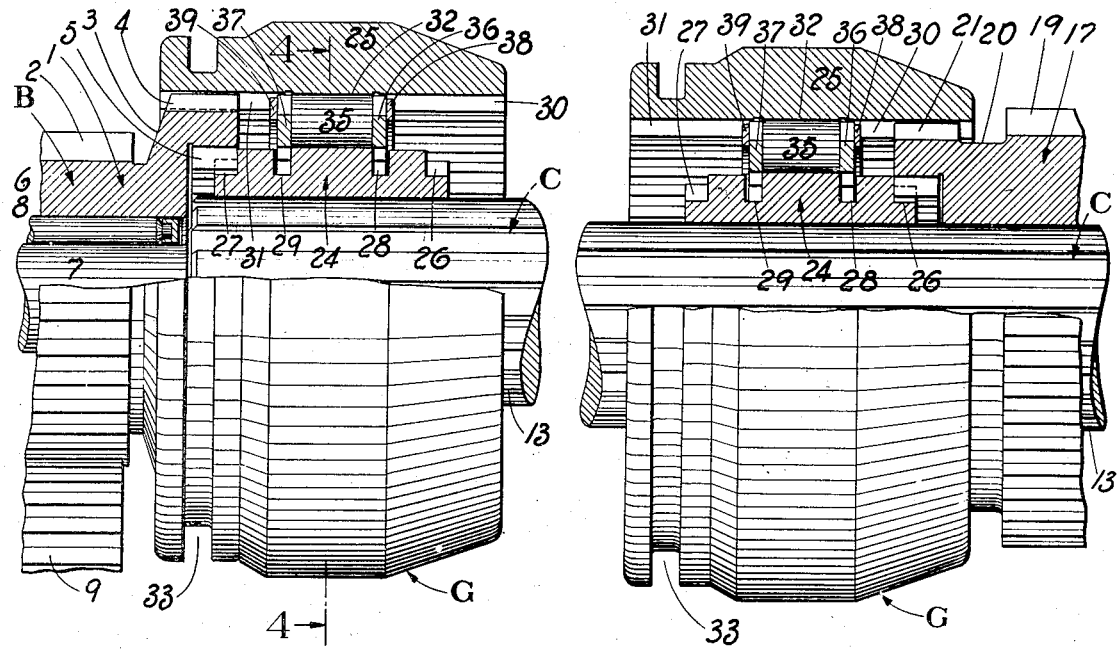
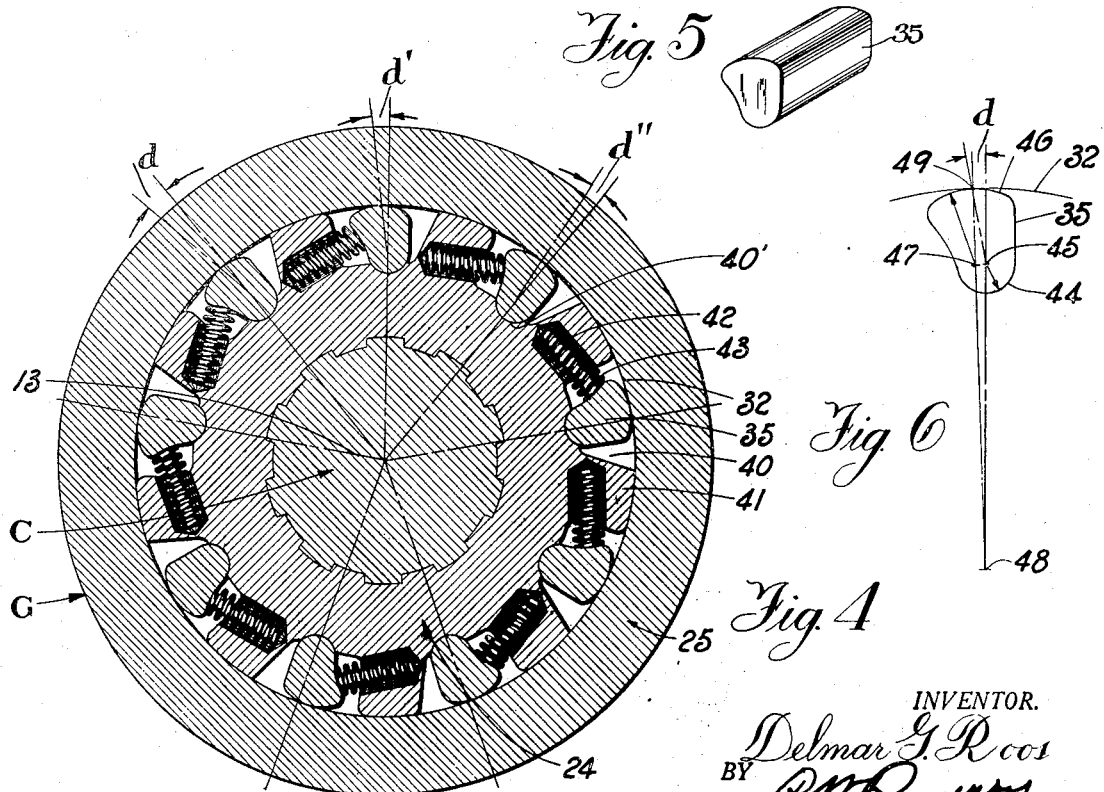

1,952,461

UNITED STATES PATENT OFFICE 1,952,461

CLUTCH FOR FREEWHEEL TRANSMISSION

Delmar G. Roos, South Bend, Ind., assignor, by mesne assignments, to Free Wheeling Patents Corporation, South Bend, Ind., a corporation of Delaware Application March 26, 1931, Serial No. 525,397

4 Claims. (Cl. 192—45.1)

This invention relates to improvements in variable speed transmissions especially designed for use in motor vehicles and deals specifically with one-way acting clutch mechanisms forming a part of such transmissions.

The primary object of the invention is to provide in a transmission for motor vehicles by means of which the operator of the vehicle may select different speed ratios between the engine and the vehicle for propelling the vehicle in a forward direction, and to cause said vehicle to be propelled in a reverse direction, a one-way acting clutch mechanism designed to permit the driven shaft of the mechanism to overrun or exceed the speed of rotation of the drive shaft when the transmission is set for certain forward speed ratios to thereby provide for free wheeling.

The term "free wheeling" used in describing this device is applied to that condition wherein, under its own momentum, the driven shaft of the transmission may exceed the speed of the drive shaft without manipulation of the main clutch of the vehicle. A great many advantages flow from the provision of free wheeling in motor vehicles, probably the most outstanding of which are reduced fuel and oil consumption, less wear on the engine and transmission, increased driving safety, and greater ease of vehicle control.

A further object of the invention is to provide in a transmission a one-way clutch mechanism of the above mentioned type wherein the overrunning or free wheeling may be permitted or prevented at the will of the operator.

A specific object of the invention is to provide an improved mechanism for accomplishing overrunning or free wheeling at certain settings of the transmission.

Other objects and advantages of the invention will be apparent during the course of the following description:

In the accompanying drawings forming a part of this specification and in which like numerals are employed to designate like parts throughout the same, Figure 1 is a vertical sectional view of the variable speed transmission embodying this invention, some of the parts thereof being broken away to better illustrate the invention.

Figure 2 is a vertical sectional view of the overrunning clutch mechanism in third speed non-free-wheeling position on a somewhat enlarged scale, certain parts thereof being broken away to show the internal structure of the mechanism.

Figure 3 is a view similar to Figure 2 but showing the clutch mechanism in second speed non-free-wheeling position.

Figure 4 is a transverse sectional view taken on the line 4—4 of Figure 2.

Figure 5 is a perspective view of one of the elements of the overrunning clutch mechanism.

Figure 6 is a diagrammatic illustration of the development of the member shown in Figure 5.

Figure 7 is an elevational view of a fragmentary portion of one end of the sleeve 25 showing the manner of forming interior clutch teeth in the ends of this sleeve to permit insertion of the sleeve upon the driven shaft of the transmission.

The variable speed transmission mechanism embodying this invention will be described briefly to enable those skilled in the art to quickly arrive at an understanding of the construction and mode of operation of the same.

The transmission includes a housing or casing A in which is supported a drive shaft B, a driven or transmission shaft C, and a countershaft E. Mounted upon the countershaft E is a gear carrying sleeve F. The drive shaft B and the driven shaft C are in axial alignment with each other and are supported in the housing A by means of the anti-friction bearings D and K. The housing A is provided with a cover H which supports a gear shift lever I.

Upon the end of the drive shaft B which projects into the casing A is a gear 1 having formed thereupon the gear teeth 2 and an enlarged portion 3. The enlarged portion 3 is in the form of a ring and has formed peripherally thereof clutch teeth 4 and, interiorly thereof, clutch teeth 5.

Within the gear 1 is provided a recess or pocket 6 within which is telescopically received the reduced end 7 of the driven shaft C. Mounted between the reduced end 7 of the driven shaft C and the annular wall of the recess 6 are anti-friction members 8.

The gear teeth 2 on the gear 1 are constantly in mesh with the teeth of a gear 9 formed on the sleeve F, on which are also formed gears 10, 11 and 12, the gears 10, 11 and 12 being of different diameters to provide different speed ratios between the drive shaft B and the driven shaft C.

The driven shaft C is splined, as at 13, the splines extending substantially the entire length of the shaft except the portion thereof receiving the gear indicated generally by the numeral 17. Slidably mounted upon the driven shaft C but prevented from rotation relative thereto by the splined formation, is the gear 14 which is slidable by means of the shifter fork 15 into intermeshing relation with the teeth of the gear 11 or with the teeth of an idler pinion 16, the teeth of which are also constantly in mesh with the teeth of the gear 12, to provide low and reverse speeds in the usual manner.

The gear member 17 is mounted upon the driven shaft C in such a manner as to be freely rotatable thereon but prevented from axial motion relative thereto by the thrust member 18 and other elements not shown. This gear 17 is provided with a set of gear teeth 19 which are constantly in mesh with the teeth of a gear 10 formed upon the countershaft sleeve F and is further provided with an extension 20 which has formed peripherally thereon, adjacent to the extremity thereof, a set of clutch teeth 21, for a purpose to be later described.

Splined upon the forward portion of the driven shaft C between the gears 1 and 17 is the over-running clutch mechanism G comprising, an inner sleeve 24 slidable axially upon the driven shaft C but prevented from rotation relative thereto by the splined formation, an outer sleeve 25, rotatably carried by the inner sleeve 24 in radial alignment therewith, and a plurality of cam elements 35 inserted between the inner sleeve 24 and the outer sleeve 25.

The inner sleeve 24 is formed interiorly thereof with splines matching the splines 13 on the driven shaft C and is provided exteriorly with peripheral clutch teeth 26 and 27 at the opposite ends thereof. Annular grooves 28 and 29 are cut into the inner sleeve 24 at symmetrically spaced positions inwardly of the clutch teeth 26 and 27 respectively. Between the annular grooves 28 and 29, the inner sleeve 24 is formed, as shown in Figure 4, with equally spaced radial extensions 41, separated by longitudinal peripheral grooves 40, the grooves subtending a considerably greater radial angle than the radial extensions. In the inner circumferential area of each of the grooves 40, there is provided a longitudinal, semi-cylindrical groove 40' which serves as a bearing surface for the inner bearing face of a cam member 35. Each radial extension 41 is provided with a tangentially directed bore 42, within which is inserted one end of a compression spring 43, the outer end of which bears against one side of an adjacent cam element 35 to urge the latter against the inner face of the outer sleeve 25, as clearly shown in Figure 4. The outer surfaces of the radial extensions 41 are preferably ground to form a cylindrical bearing surface for the outer sleeve 25.

The outer sleeve 25 has clutch teeth 30 and 31 formed interiorly in the ends thereof, the teeth of one set of the clutch teeth being so spaced as to permit the radial extensions 41 on the inner sleeve 24 to pass there-between. Between the inner ends of the clutch teeth 30 and 31, the outer sleeve 25 is formed with a smooth cylindrical surface 32 of such a diameter as to have a bearing fit with the outer surfaces of the radial extensions 41 on the inner sleeve 24. Exteriorly at one end the outer sleeve 25 has formed therein an annular groove 33 to accommodate the shifter fork 34.

The cam elements 35 are placed in the grooves 40, each cam element having a rounded bearing surface resting in a semi-cylindrical bearing groove 40' in the inner sleeve 24, and a rounded outer surface bearing against the interior cylindrical surface 32 of the outer sleeve 25, the rounded outer surfaces being held in contact with the cylindrical surface 32 of the outer sleeve 25 by the thrust of the compression springs 43 bearing against one face of the cam elements.

Referring to Figure 6, it is observed that each cam element 35 is provided with a semi-cylindrical bearing surface 44, the center of which is the axis 45, and an upper bearing surface 46 in the form of an involute, but which in practice, is an arc struck about the axis 47 as a center. The dimension of the involute is the distance from the axis 45 to the axis 47 and this distance is taken so that a line drawn from the axis 48, which is the center of rotation of the device, to the axis 49, which is the line of contact of the surface 46 of the cam element with the surface 32 of the outer sleeve 25, will make a radial angle d with a line drawn from the axis 48 through the axis 45. In practice, it has been found that the angle d should preferably be between six and nine degrees. The outer surface 46 of the cam element 35 is made in the form of an involute in order to obtain a wedging action between the cam and the outer sleeve 25 and to provide a self-adjusting take-up for wear on the outer surface 46 of the cam element and the surface 32 of the outer sleeve 25.

From the disclosure of Figure 4, it will be observed that there are nine cam elements arranged about the inner sleeve 24. These nine elements are divided into three groups of three cam elements each. In each group, one of the cam elements has an involute angle of approximately nine degrees as indicated by the angle d illustrated in Figures 4 and 6. This is known as the shock angle cam and takes the initial load. This cam however, tends to slip with varying load conditions, so there are provided, following the shock angle cam, cams known as load angle cams. These cams have an involute angle of preferably approximately six and seven degrees as illustrated at d' and d'' in Fig. 4 and take up the load without slipping. These load angle cams are prevented from binding by the action of the shock angle cam.

As explained above it has been found that a distance between the axes 45 and 47 to produce a radial angle d of approximately 6° is satisfactory for cam elements designed to carry a steady load without shock. However, it has been found that the radial load of such a cam may become sufficient under conditions of shock to either distort the cam or cause it to bind between the inner and outer sleeves. In order to obviate this condition, some of the cam elements are made with a somewhat greater degree of involution and are herein termed, shock angle cam elements. These last mentioned cam elements will act as a buffer to absorb the initial shock transmitted from the outer sleeve to the cam member, but having a somewhat excessive angle of involution, will tend to slip in relation to the inner surface of the outer sleeve, whereupon the load will be transferred to those cam elements having a smaller degree of involution, herein termed, the load angle cam elements.

While the various angles of the involutes as given above, has been found to give very satisfactory results in a practical application of the device, it is to be understood that such angles may be varied to meet varying conditions of use. Also, while this illustration shows an application of nine cam elements in groups of three cam elements each, it is apparent that these numbers may be varied according to the specific conditions in the use of the device. For instance, in a light job it might be found advantageous to use six cam elements in three groups of two cam elements each, one shock cam and one load cam to the group, while in a heavy job such as a motor bus transmission, it might be found advantageous to use four or more groups with three or more cam elements to each group.

In the assembly of the device, thrust washers 36 and 37 are passed over the clutch teeth 26 and 27 respectively of the inner sleeve 24, and are positioned in the grooves 28 and 29 with their inner radial surfaces bearing against the sides of the radial extensions 41. Snap rings 38 and 39 are inserted in the outer sleeve 25 between the inner ends of the clutch teeth 30 and 31 and the thrust washers 36 and 37 respectively. This construction maintains the inner sleeve 24, the outer sleeve 25 and the cam elements 35 in radial alignment with each other so that the entire clutch mechanism G may be shifted as a unit along the driven shaft C.

The mode of operation of this transmission will now be described in detail:

In order to place the transmission in first or reverse speed, the gear 14 is shifted axially of the driven shaft C along the splines 13 by means of the shifter fork 15 into mesh with the gear 11 or the pinion 16 respectively, in the usual manner. In order to place the transmission in second speed and employ the free wheeling principle of the mechanism G, the sleeve 25 together with the cams 35 and inner sleeve 24, are shifted axially of the driven shaft C along the splines 13 until the clutch teeth 30 formed on the sleeve 25 are meshed with the clutch teeth 21 formed on the extension 20 of the gear 17. In this position of the elements, the power will be transmitted from the drive shaft B through the teeth 2 of the gear 1 to the gear 9, through the sleeve F to the gear 10, from the gear 10 to the gear 17, and by means of the clutch teeth 21 and 30 to the outer sleeve 25. Rotation of the outer sleeve 25 in a direction to apply power to the driven shaft C will cause the cams 35 to bind between the inner surface 32 of the outer sleeve 25 and the bearing surfaces in the inner sleeve 24, thereby transmitting the power to the inner sleeve 24 and, by reason of the splined connection between the inner sleeve 24 and the driven shaft C, to the driven shaft. In the event that the speed of the driven shaft C becomes greater than the speed of the drive shaft B, the rotary action between the inner sleeve 24 and the drive shaft B, to which is operatively connected the outer sleeve 25, will be in an opposite direction, thereby causing the cams 35 to be released from their gripping action against the inner surface of the outer sleeve 25, and thereby permit relative rotation between the inner sleeve 24 and the outer sleeve 25 and consequently, permit the driven shaft C to overrun with respect to the drive shaft B.

In the event that it is desired to eliminate or lock-out the overrunning or free wheeling function of the clutch G, an extension, not shown, on the lower end of the gear shift lever I is depressed below the inner end of the stop member 55, thereby permitting an over shift of the gear shift lever I. This over shift gives the clutch element G a further longitudinal movement along the driven shaft C until the clutch teeth 26 on the inner sleeve 24 become meshed with the complementary clutch teeth formed interiorly of the extension 20 on the gear 17, as shown in Figure 3. In this case, the power is transmitted from the drive shaft B through the gears 1 and 9, sleeve F, and gears 10 and 17, the clutch teeth formed interiorly of the extension 20, clutch teeth 26 and inner sleeve 24, to the driven shaft C, thereby completely by-passing or omitting the overrunning or free wheeling elements 25 and 35 of the clutch element G.

When it is desired to place the transmission in third speed, the clutch element G is shifted axially along the driven shaft C until the clutch teeth 31 on the outer sleeve 25 are brought into mesh with the clutch teeth 4 formed on the extension 3 of the gear 1. In this position of the elements, the power will be transmitted from the drive shaft B through the gear 1 and clutch teeth 4 to the outer sleeve 25, from the outer sleeve 25 through the cams 35 to the inner sleeve 24, and then to the driven shaft C.

In the event that the speed of the driven shaft C becomes greater than the speed of the drive shaft B, the engagement of the cams 35 with the inner surface of the outer sleeve 25 will be released and the driven shaft C will be permitted to overrun with relation to the drive shaft B.

In the event it is desired to lock-out the free wheeling function of the clutch element G in third speed, the extension on the lower end of the gear shift lever I is depressed below the inner end of the stop 56 thereby permitting an over shift of the gear shift lever I, which moves the clutch mechanism G a further distance along the driven shaft C into such position that the clutch teeth 27 on the inner sleeve 24 become meshed with the clutch teeth 5 formed interiorly of the extension 3 of the gear 1. The power in this case is transmitted from the drive shaft B to the gear 1, clutch teeth 5 to the clutch teeth 27, to the inner sleeve 24 and then to the driven shaft C, thereby by-passing the overrunning clutch elements 35 and 25 and omitting their function from the operation of the transmission.

It is to be understood that the form of the invention herewith shown and described is illustrative only and to be taken as an example of the same and that formal changes and changes in the shape, size and arrangement of parts may be resorted to without departing from the spirit of the invention or the scope of the sub-joined claims.

What I claim is:

1. In a vehicle transmission mechanism, a drive shaft, a driven shaft, and means to operatively connect said drive shaft to said driven shaft to provide a one-way drive for the vehicle, said means comprising, an inner sleeve mounted on said driven shaft, an outer sleeve rotatably mounted upon said inner sleeve and in radial alignment therewith, and a plurality of cam elements pivotally carried by said inner sleeve, said cam elements having faces with varying degrees of involution engageable with said outer sleeve to wedge between said sleeves and thereby cause them to rotate as a unit under the power of said drive shaft.

2. In a vehicle transmission mechanism, a drive shaft, a driven shaft, and means to operatively connect said drive shaft to said driven shaft to provide a one-way drive for the vehicle, said means comprising, an inner sleeve mounted on said driven shaft, an outer sleeve mounted upon said inner sleeve and in radial alignment therewith, and a plurality of cam elements pivotally carried by said inner sleeve having involute surfaces engageable with said outer sleeve, said cam elements being divided into groups with an equal number of cam elements in each group, the involute surfaces of the cam elements in each group having varying degrees of involution to provide shock elements and load elements.

3. In a vehicle transmission mechanism, a drive shaft, a driven shaft, and means to operatively connect said drive shaft to said driven shaft to provide a one-way drive for the vehicle, said means comprising, an inner sleeve formed with peripheral grooves in its outer face mounted on said driven shaft, an outer sleeve mounted on said inner sleeve and in radial alignment therewith, and cam elements, each comprising a semi-cylindrical bearing surface engageable with the corresponding groove in said inner sleeve, and an involute clutch surface engageable with said outer sleeve, said involute surface being the surface of rotation of a line rotated about an axis laterally spaced from the axis of said semi-cylindrical bearing surface.

4. In a vehicle transmission mechanism, a drive shaft, a driven shaft, and means to operatively connect said drive shaft to said driven shaft to provide a one-way drive for the vehicle, said means comprising, an inner sleeve mounted on one of said shafts, an outer sleeve rotatably mounted on said inner sleeve and in radial alignment therewith, and a plurality of cam elements each having a bearing surface engageable with said inner sleeve and a wedging surface engageable with said outer sleeve, said bearing surface being the surface of rotation of a line parallel with and rotated about one longitudinal axis of said cam element, and said wedging surface being the surface of rotation of a line parallel with and rotated about a second longitudinal axis of said cam element spaced laterally from said first longitudinal axis, the distance between said longitudinal axes varying in said different cam elements to provide different degrees of involution for said wedging surfaces.

DELMAR G. ROOS.